United States Patent
Fichtner-Pflaum et al.

(10) Patent No.: US 11,674,557 B2
(45) Date of Patent: Jun. 13, 2023

(54) BRAKE ASSEMBLY FOR AN ELECTRIC MOTOR

(71) Applicant: SEW-EURODRIVE GMBH & CO. KG, Bruchsal (DE)

(72) Inventors: Gerolf Fichtner-Pflaum, Kraichtal-Unteröwisheim (DE); Florian Rieger, Karlsruhe (DE)

(73) Assignee: SEW-EURODRIVE GMBH & CO. KG, Bruchsal (DE)

(*) Notice: Subject to any disclaimer, the term of this patent is extended or adjusted under 35 U.S.C. 154(b) by 319 days.

(21) Appl. No.: 17/055,818

(22) PCT Filed: Apr. 25, 2019

(86) PCT No.: PCT/EP2019/025127
§ 371 (c)(1),
(2) Date: Nov. 16, 2020

(87) PCT Pub. No.: WO2019/219242
PCT Pub. Date: Nov. 21, 2019

(65) Prior Publication Data
US 2021/0231181 A1    Jul. 29, 2021

(30) Foreign Application Priority Data
May 14, 2018    (DE) .......................... 102018003843.3

(51) Int. Cl.
*F16D 59/02*    (2006.01)
*F16F 15/126*    (2006.01)
(Continued)

(52) U.S. Cl.
CPC ............ *F16D 59/02* (2013.01); *F16F 15/126* (2013.01); *H02K 7/1025* (2013.01);
(Continued)

(58) Field of Classification Search
CPC .... F16D 59/02; F16D 65/0056; F16D 65/123; F16D 65/186; F16D 2055/0008; F16D 2121/22; F16F 15/126; H02K 7/1025
(Continued)

(56) References Cited

U.S. PATENT DOCUMENTS

| 6,202,804 B1 | 3/2001 | Dropmann et al. |
| 6,321,883 B1 | 11/2001 | Pfann et al. |

(Continued)

FOREIGN PATENT DOCUMENTS

| CN | 1225158 A | 8/1999 |
| CN | 201594774 U | 9/2010 |

(Continued)

OTHER PUBLICATIONS

SEW-EURODRIVE GmbH & Co KG: "Explosion-Proof MOVIMOT Drives in Category 3D" Operating Instructions—GC310000 ( Edition Dec. 2005), pp. 1-3.

(Continued)

*Primary Examiner* — Christopher P Schwartz
(74) *Attorney, Agent, or Firm* — Carter, DeLuca & Farrell LLP (57) ABSTRACT

A brake assembly for an electric motor includes: a magnetic body, a winding, a bolt, a housing part with a brake surface, an armature disk, a brake pad plate, a shaft, a spring part, and a first bushing. The housing part is connected to the magnetic body by the bolt, with a positive fit in at least the circumferential direction. The first bushing is accommodated in a second bushing. The spring part supported on the housing part presses the first bushing and/or the second bushing toward the magnetic body. The radial clearance range covered by the armature disk includes the radial clearance range covered by the second bushing, and the axial (Continued)

region covered by the armature disk includes the axial region covered by the second bushing.

16 Claims, 7 Drawing Sheets

(51) Int. Cl.
    *H02K 7/102*      (2006.01)
    *F16D 65/00*      (2006.01)
    *F16D 65/12*      (2006.01)
    *F16D 65/18*      (2006.01)
    *F16D 55/00*      (2006.01)
    *F16D 121/22*      (2012.01)

(52) U.S. Cl.
    CPC ........ *F16D 65/0056* (2013.01); *F16D 65/123* (2013.01); *F16D 65/186* (2013.01); *F16D 2055/0008* (2013.01); *F16D 2121/22* (2013.01)

(58) Field of Classification Search
    USPC ........... 188/72.1, 72.3, 156–164; 310/77, 93, 310/103, 109, 123
    See application file for complete search history.

(56) References Cited

U.S. PATENT DOCUMENTS

| | | |
|---|---|---|
| 9,777,688 B2 | 10/2017 | Rehwald et al. |
| 2010/0025168 A1 | 2/2010 | Klingler et al. |
| 2018/0017119 A1* | 1/2018 | Hufnagel .............. F16D 66/024 |
| 2021/0207667 A1* | 7/2021 | Fichtner-Pflaum .......................... H02K 7/1025 |

FOREIGN PATENT DOCUMENTS

| | | | | |
|---|---|---|---|---|
| DE | 102008028605 A1 | 12/2009 | | |
| DE | 102012205580 A1 | 10/2013 | | |
| DE | 102012019001 A1 | 3/2014 | | |
| DE | 102012019415 A1 * | 4/2014 | ............. | F16D 55/28 |
| DE | 102012019415 A1 | 4/2014 | | |
| DE | 102014018485 B3 * | 9/2015 | ............ | B60T 13/748 |
| DE | 102014103837 A1 | 9/2015 | | |
| EP | 0957281 A2 | 11/1999 | | |

OTHER PUBLICATIONS

"Bushing rubber-metal on a white background" https://de.depositphotos.com, accessed on Jan. 3, 2019, pp. 1-4.
Febi Bilstein Bushing, A Steering Lever Shaft, https://www.lott.de/de/, Item No. XZ55439, accessed on Jan. 3, 2019, pp. 1-4.
Autoworld Spare Parts Online Store, Febi Bilstein 08906—Bush, Steering Arm Shaft, Reference 08906, accessed at http://cars-parts-services.com/demoshop/bush-steering-arm-shaft/15462-febi-bilstein-08906--bush-steering-arm-shaft-4027816089063.html on Dec. 8, 2020, pp. 1-3.
International Search Report issued in International Application No. PCT/EP2019/025127, dated Jul. 30, 2019, pp. 1-2, English Translation.
Office Action issued by the European Patent Office dated Oct. 7, 2022, in corresponding EP Patent Application No. 19722791.1, pp. 1-5.

* cited by examiner

BRAKE ASSEMBLY FOR AN ELECTRIC MOTOR

FIELD OF THE INVENTION

The present invention relates to a brake assembly for an electric motor.

BACKGROUND INFORMATION

Certain conventional It is generally known that brake motors have an electric motor including a brake.

From the European Patent Document No. 0 957 281 describes an electromagnetically actuable brake.

German Patent Document No. 10 2012 205 580 describes a holder for fastening a component to an internal combustion engine and a bearing bush for such a holder.

SUMMARY

Example embodiments of the present invention provide a brake assembly for an electric motor, in which an angle detection of a rotor shaft of the electric motor is able to be carried out with high accuracy.

According to an example embodiment of the present invention, a brake assembly for an electric motor includes: a brake pad plate, a shaft, a magnetic body, a winding, a housing part with a brake surface, and an armature disk. The brake pad plate and the armature disk are situated axially between the housing part and the magnetic body, and a sealing element is connected to the housing part in a first axial region and to the magnetic body in a second axial region, in particular press-fitted in a non-positive manner. The sealing element radially surrounds the armature disk and the brake pad plate, in particular covers and/or seals the space region accommodating the armature disk and the brake pad plate in the direction of the environment, and a radially-inwardly projecting nose region is provided on the sealing element, which restricts the armature disk in the axial direction.

This has the advantage that the sealing element is arranged as a seal against the entry of dirt on the one side and as an element that dampens the movement of the armature disk, in particular the impact of the armature disk on the brake pad plate, on the other side. The nose region on the sealing element made from plastic or rubber is arranged as one piece, i.e., is produced in one part. The sealing ring has an annular configuration, and the nose region is likewise arranged in annular form.

According to example embodiments, a sealing ring, which restricts the armature disk counter to the axial direction, is situated on the magnetic body, in particular, the sealing ring is accommodated in an annular groove introduced into the magnetic body, the ring axis in particular being the axis of rotation of the shaft. This offers the advantage that an element that dampens the movement of the armature disk is situated also on the side of the armature disk that faces away from the nose region.

According to example embodiments, the spring force that is generated by the sealing ring and acts on the armature disk is greater in its absolute amount than the spring force that is generated by the elastically tensioned, in particular pretensioned, nose region and acts on the armature disk, in particular in the released state of the brake assembly, i.e., especially when the winding is energized. This has the advantage that the restoring effect of the spring is not reduced and the method of functioning of the brake assembly is thus maintained, possibly more slowly as the case may be.

According to example embodiments, the radial clearance range covered by the sealing element, in particular by the nose region of the sealing element, overlaps with the radial clearance range covered by the armature disk. This offers the advantage that the armature disk is situated against the nose region so that an elastic force is introduced into the armature disk.

According to example embodiments, the axial region covered by the sealing element, in particular by the nose region of the sealing element, overlaps with the axial region covered by the brake pad plate and/or abuts the axial region covered by the armature disk, in particular without an overlap. This has the advantage that a compact system is able to be achieved. The brake pad plate has a radially smaller extension than the armature disk. The nose region may thus be placed in the free space region radially outside the brake pad plate. This achieves a compact configuration.

According to example embodiments, the ring axis of the sealing ring is the axis of rotation of the shaft. This is considered advantageous insofar as it is possible to achieve a uniform contact of the armature disk on the sealing ring, in particular the O-ring, which is situated in parallel with its end face.

According to example embodiments, the nose region has an annular configuration and/or has a circumferential configuration in the circumferential direction, the ring axis of the ring-type nose region in particular being the axis of rotation of the shaft, and/or the axis of symmetry of the nose region in particular being the axis of rotation of the shaft. This has the advantage that the sealing element and the nose region have a circumferential configuration in the circumferential direction so that an uncomplicated production is possible, in particular as an extruded profile.

According to example embodiments, the ring part is disposed at a radial distance, in particular the greatest radial distance, which is situated in the radial clearance range covered by the armature disk. This offers the advantage that an effective damping is able to be achieved.

According to example embodiments, the brake assembly includes: a brake pad plate, a driver, and a shaft. The driver has an inner and an outer driver part, which are connected to each other with the aid of an intermediate layer, in particular such that the driver is arranged as a metal-plastic composite part. The brake pad plate has an inner tooth system, which meshes with an outer tooth system of the outer driver part so that the brake pad plate is connected to the driver, in particular to the outer driver part and/or the shaft, in a torsionally fixed but axially displaceable manner. The inner diver part is connected to the shaft in a torsionally fixed manner, in particular with the aid of a feather key connection, especially without play. For example, the inner driver part, the outer driver part, the intermediate layer and/or the driver is/are arranged as ring parts in each case. For example, the outer driver part includes having a tooth system, in particular an outer tooth system, on its radially outer surface, which meshes with the inner tooth system of the brake pad plate.

The axial direction is particularly aligned in parallel with the direction of the axis of rotation.

This has the advantage that a torque jerk is introduced into the shaft only in damped form and the angle detection of the shaft is therefore able to be performed without interference.

According to example embodiments, the driver has an inner driver part and an outer driver part as well as an intermediate layer which is situated radially between the inner and outer driver part, in particular, the inner driver part and the outer driver part are spaced apart from each other, and/or the inner and the outer driver parts have an annular configuration in each case, and/or the inner driver part is situated radially within the outer driver part. This offers the advantage that torque jerks and/or torque flows transmitted by the driver are able to be damped. In conjunction with the damping of impacts introduced in the circumferential direction from the armature disk to the housing part and/or the magnetic body, significant protection for an angle sensor situated on the motor is achieved, in particular a sensor shaft connected to the rotor shaft in a torsionally fixed manner. The angle detection is therefore able to be obtained in a robust manner with regard to interference effects generated during the operation of the electromagnetically actuable brake.

According to example embodiments, the inner driver part has web regions which project radially outward, in particular into the intermediate layer. This has the advantage that the intermediate layer is able to be given a more elastic and/or a softer configuration than the two driver parts. It is therefore possible to achieve a damping of force flows and/or torque flows transmitted through the intermediate layer.

According to example embodiments, the intermediate layer is produced from a plastic material, in particular from a polymer and/or an elastomer, and/or the two driver parts are produced from metal, in particular steel. This offers the advantage that economical and simple damping is able to be provided.

According to example embodiments, the radial clearance range covered by the outer driver part, in particular the radial clearance range covered by the web regions of the outer driver part, overlaps with the radial clearance range covered by the inner driver part, in particular overlaps with the radial clearance range covered by the web regions of the inner driver part. This offers the advantage that an effective positive connection with play becomes effective between the two driver parts if the intermediate layer fails. If state changes arise in the brake assembly, i.e., in particular during the release or the application of the brake assembly, a noise, i.e., an acoustic warning signal, is thus generated when contact is made between the flanks of the web regions.

According to example embodiments, the outer driver part has at its radially outer surface a tooth system, in particular an outer tooth system, which meshes with the inner tooth system of the brake pad plate. This offers the advantage that the driver as a whole is obtained from multiple parts, i.e., in particular as a composite part. However, the outer dimension is obtained in the same manner as in a driver which is arranged in one piece. A one-piece driver can thus be replaced by a driver composed of multiple parts, which therefore makes it possible to achieve better damping.

According to example embodiments, the shaft is mounted in the bearing accommodated in the flange part and in a further bearing, which is accommodated in an additional flange part, the flange parts being connected to a stator housing of the motor, the shaft in particular being the rotor shaft of the motor.

This has the advantage that the shaft is indeed mounted in a rotatable manner, yet impacts are introduced into the shaft during the release or the application of the brake assembly, so that interference in an angle sensor could occur on the B-side, i.e. on the side of the brake assembly facing away from the stator, when the angular position of the rotor is detected if the measured described herein would not make it possible to dampen impacts with the aid of the first bushing, which is softer in comparison with the second bushing.

According to example embodiments, the brake assembly additionally includes: a magnetic body, a winding, at least one bolt, a housing part with a brake surface, an armature disk, at least one spring part, in particular a counterspring, and at least one first bushing. The housing part is connected to the magnetic body with the aid of the bolt, in particular with a positive fit in at least the circumferential direction. The first bushing is accommodated in a second bushing, in particular is pressed into the second bushing, and the spring part supported on the housing part presses the first bushing and/or the second bushing toward the magnetic body. The radial clearance range covered by the armature disk includes, in particular encompasses, the radial clearance range covered by the second bushing, and the axial region covered by the armature disk includes, in particular encompasses, the axial region covered by the second bushing or overlaps with it.

This has the advantage that the armature disk is connected to the magnetic body in a torsionally fixed manner in that it is stopped at the second bushing in the circumferential direction. The second bushing transmits the stop impact via the first bushing to the bolt, and the bolt then transmits it to the magnetic body and also to the housing part. Thus, the strike impact is able to be damped by the elastic configuration of the first bushing. At the same time, the first bushing is arranged as an axial slide bearing of the bushing combination, that is, the two press-fitted bushings, i.e., the first and the second bushing.

According to example embodiments, the first bushing is made from a softer and/or a more elastic material than the second bushing. This has the advantage that the impact is able to be damped and a slide bearing is able to be provided in the axial direction so that low static friction is present during an adjustment of the nut due to wear of the brake pads and corrosion is avoidable. This is because the bolts are made from metal, whereas the first bushing is made from plastic.

According to example embodiments, the first bushing is made from rubber, a rubberized material or a plastic material, in particular a polymer, and the second bushing is made from a metal, in particular steel. This offers the advantage that the impact of the armature disk on the second bushing is able to be damped.

According to example embodiments, the first bushing is pressed into the second bushing, and the first bushing in particular is an O-ring. This has the advantage that a firm connection is provided. In addition, multiple functions may be obtained by the bushing combination, such as a slide bearing, impact damping and a stable outer surface.

According to example embodiments, the first bushing is slidingly mounted on the bolt, that is to say, in particular placed on the bolt with an accurate fit. This offers the advantage that damping of impacts and the mounting of the bushing combination with sliding bearings is able to be brought about. In addition, the armature disk strikes the second bushing, which may be produced from a stable material that does not cause any substantial damping but makes it possible to achieve a long service. The damping of impacts is performed by the first bushing, which is accommodated and/or pressed into the second bushing.

According to example embodiments, the armature disk is connected to the second bushing and/or the bolt with play and with a positive fit in the circumferential direction. This offers the advantage that the armature disk has a greater radial extension than the brake pad plate and the bolt is situated in the radially projecting radial clearance range. The bolt is therefore able to be passed through a recess that extends axially through the armature disk. In this manner, the brake pad plate is able to freely rotate along with the shaft in the circumferential direction and the armature disk is situated with a positive fit in the circumferential direction.

According to example embodiments, the bolt is connected to the housing part by screws and guided through a recess that extends radially through the magnetic body. For example, a nut is screwed onto a threaded region situated on the side of the magnetic body facing away from the housing part. For example, the bolt includes a step by which it rests against a step of a stepped bore in the housing part. This has the advantage that the brake assembly is adjustable if wear occurs at the brake pads, that is to say, the axial clearance between the magnetic body and the housing part is adaptable, the adjustment, i.e., of the nut, being able to be performed from the direction of the B-side.

According to example embodiments, the bolt is connected to the magnetic body by screws and routed through a recess that passes axially through the housing part. For example, a nut is screwed onto a threaded region situated on the side of the housing part facing away from the magnetic body. For example, the bolt has a step via which it rests against a step of a stepped bore in the magnetic body. This has the advantage that the brake assembly is adjustable if wear occurs at the brake pads, that is to say, the axial clearance between the magnetic body and the housing part is adaptable, the adjustment, i.e., of the nut, being able to be performed from the direction of the B-side.

According to example embodiments, the winding is accommodated in a recess of the magnetic body, and/or the armature disk is connected with play to the magnetic body, in particular to the bolt, in an axially movable and torsionally fixed manner. This offers the advantage that as few field lines as possible are lost.

According to example embodiments, a brake pad plate, which is axially displaceable on the shaft and connected to the shaft in a torsionally fixed manner, is situated between the housing part and the armature disk. This has the advantage that the brake pad plate is breakable on both sides, that is to say, the armature disk is able to act on the first brake pad, and a second brake pad is able to be pressed onto a brake surface of the housing part. The brake surface, like the armature disk, is finish-machined, in particular ground.

According to example embodiments, the brake pad plate has an inner tooth system, which meshes with an outer tooth system that is introduced into the shaft or introduced into a driver, which is connected to the shaft in a torsionally fixed manner, in particular with the aid of a feather key connection, the driver in particular being arranged as a ring part. This offers the advantage that the tooth systems make it possible to introduce a high brake torque from the brake pad plate via the driver or directly into the shaft.

According to example embodiments, a spring supported on the magnetic body pushes the armature away from the magnetic body, i.e., in particular in the axial direction toward the brake pad plate. When the ring winding is energized, the armature disk is pulled toward the magnetic body while overcoming the spring force generated by the spring, and when no energization takes place, the spring pushes the armature disk onto the brake pad plate, in particular onto a brake pad situated on the side of the brake pad plate facing the armature disk, in particular such that the brake pad plate is pressed onto the housing part, in particular by its other brake pad, in particular onto a brake surface arranged on the housing part. This has the advantage that the electromagnetically actuable brake assembly is applied when no energization occurs. However, during an energization the brake assembly is released.

According to example embodiments, the housing part is tightly and reversibly connected to a flange part which accommodates a bearing for mounting the shaft. This has the advantage that the electromagnetically actuable brake is able to be stocked as a preassembled unit and may subsequently be connected to the motor.

According to example embodiments, a sealing element covers and/or seals the space region accommodating the armature disk and the brake pad plate from the environment. This offers the advantage that the entry of dirt into the friction region is able to be prevented.

According to example embodiments, the axial region covered by the second bushing is smaller than the axial region covered by the first bushing, and the spring part pushes the first bushing toward the magnetic body. This offers the advantage that the harder material is able to absorb the impact transmitted from the armature disk in the circumferential direction so that a long service life is achievable. In addition, the spring part exerts pressure on the first bushing, which means that the part struck by the armature disk, i.e., the second bushing, is not additionally limited and/or loaded.

According to example embodiments, the axial region covered by the second bushing is equal to or greater than the axial region covered by the first bushing, and the spring part pushes the second bushing toward the magnetic body. This has the advantage that the first bushing performs the function of mounting via sliding bearings and of impact damping, while the second bushing is pushed onto the magnetic body. The impact introduced into the second bushing in the circumferential direction is thus at least proportionally also dissipated by the static friction that comes to bear in a relative displacement of the first bushing in the circumferential direction and the sliding friction of the frictional contact between the second bushing and the magnetic body or the spring part. The first bushing must thus dampen only the residual impact energy.

Further features and aspects of example embodiments of present invention are described in greater detail below with reference to the appended schematic Figures.

DETAILED DESCRIPTION

Figure 1:
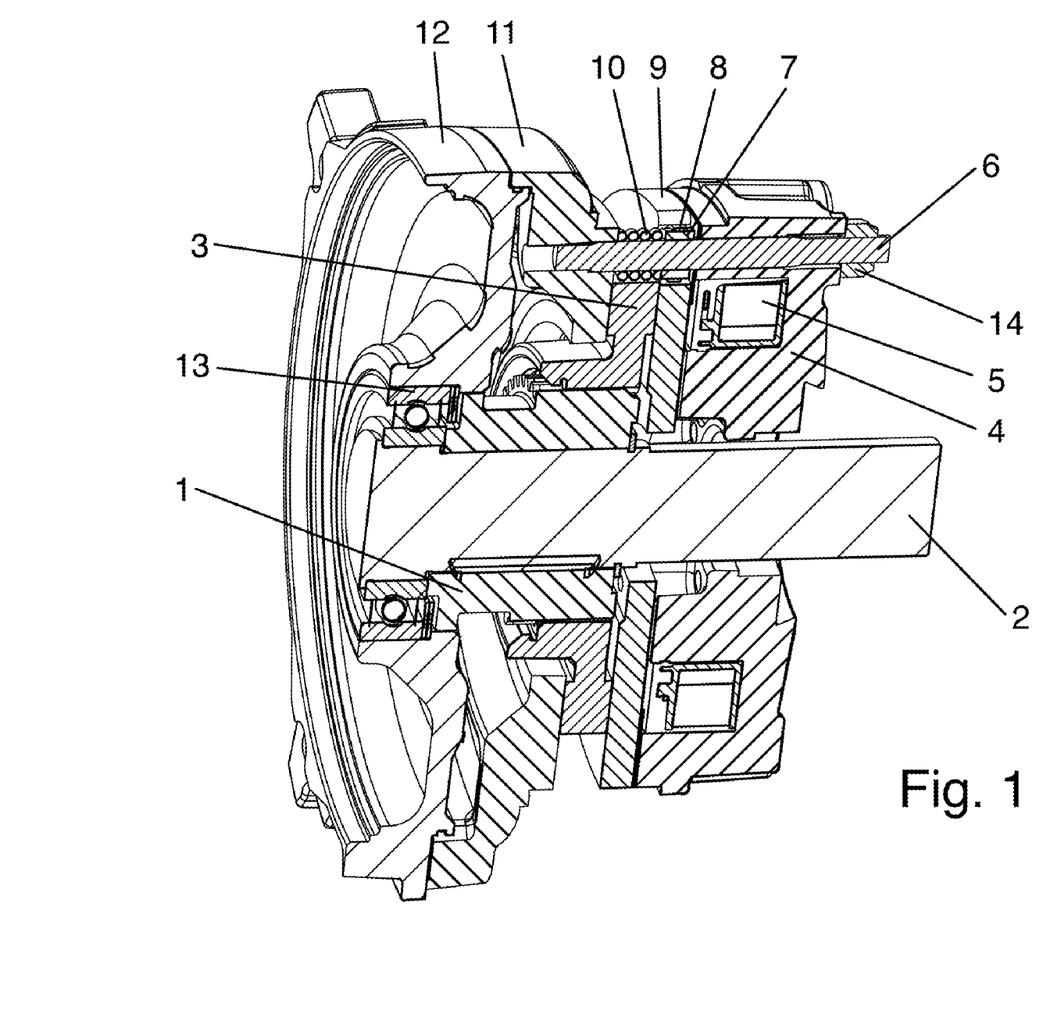
FIG. 1 is a partial, perspective cross-sectional view of an electromagnetically actuable brake assembly of an electric motor according to an example embodiment of the present invention.
Figure 2:
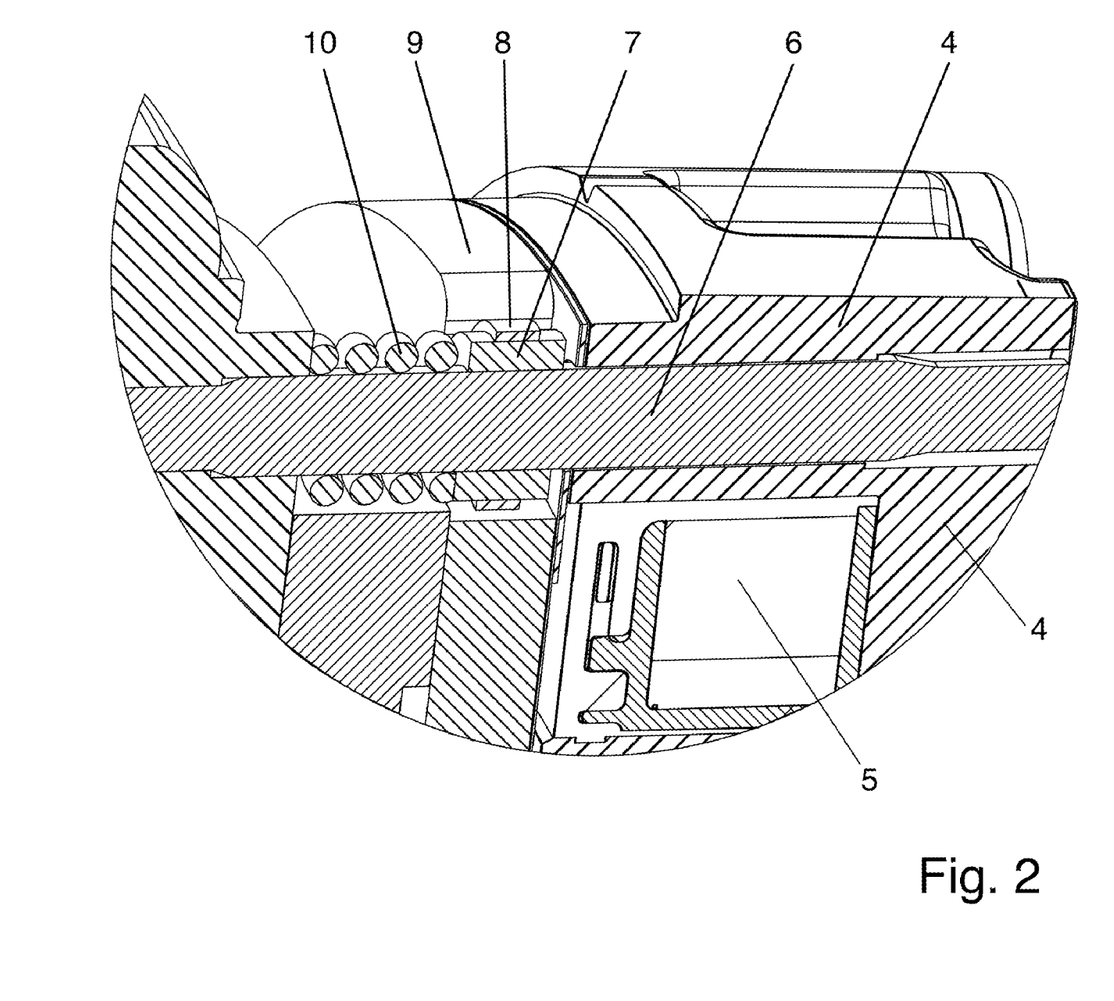
FIG. 2 is an enlarged view of a portion of FIG. 1.
Figure 3:
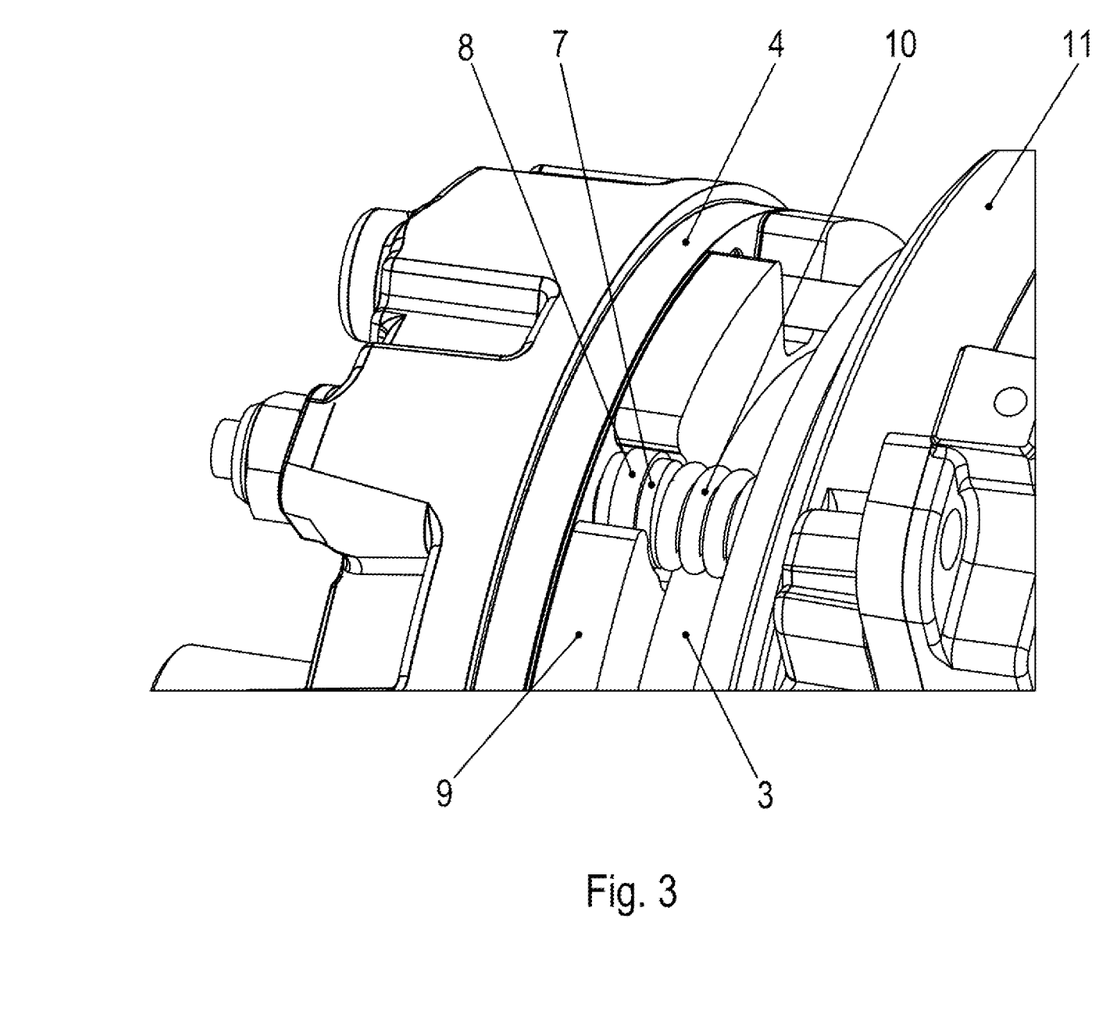
FIG. 3 is another enlarged view of a portion of the electromagnetically actual brake assemble illustrated in FIG. 1.

As illustrated in FIGS. 1 through 3, the brake assembly has a shaft, in particular a rotor shaft 2 of the electric motor, and an annular driver 1 is slipped onto the shaft and connected in a torsionally fixed manner with the aid of a feather key connection.

Driver 1 has on its outer circumference a tooth system, in particular an outer tooth system. The outer tooth system, for example, has no helix angle and thus is straight-toothed so that the teeth extend in the axial direction in each case.

Slipped onto driver 1 is a brake pad plate 3, which has an inner tooth system that meshes with the outer tooth system. As a result, brake pad plate 3 is connected to driver 1 in a torsionally fixed but axially displaceable manner.

Brake pad plate 3 has brake pads axially on both sides.

A magnetic body 4, in particular from cast steel, has an annular recess into which a ring winding 5 is inserted.

Axially directed bolts 6, in particular threaded bolts, are guided through axially uninterrupted recesses through magnetic body 4 and screwed into threaded bores of a housing part 11 by their threaded regions.

On the side of magnetic body 4 facing away from housing part 11, nut 6 is screwed onto a further threaded region of bolts 6 in each case so that the magnetic body is restricted to a maximum clearance from housing part 11.

A counterspring, in particular a coil spring, supported on housing part 11 is placed on bolt 6 and exerts pressure on a first bushing 7, in particular a plastic bushing.

The first bushing is pressed into a slightly larger second bushing 8, which is produced from a different material than the first bushing.

Second bushing 8 is, for example, made from metal, in particular from steel.

Counterspring 10 thus presses first bushing 7 onto housing part.

An armature disk 9 is axially situated between brake pad plate 3 and magnetic body 4.

The radial clearance covered by the armature disk includes the radial clearance range covered by bolts 6 together with first bushings 7 placed on the bolts with second bushings 8.

Bolts 6 with first bushings 7 placed on bolts 6, together with second bushings 8 accommodating first bushings 7 axially project through recesses that extend through armature disk.

In this manner, armature disk 9 is connected to the magnetic body with play in a torsionally fixed manner, but is situated so as to allow for an axial movement.

A spring, which is supported on the magnetic body, presses armature disk 9 away from magnetic body 4, i.e., in particular in an axial direction toward brake pad plate 3.

When ring winding 5 is energized, armature disk 9 is pulled toward magnetic body 4, armature disk 9 in the process overcoming the spring force generated by the spring.

If no energization takes place, the spring presses armature disk 9 onto brake pad plate 3, in particular onto a brake pad situated on a side of brake pad plate 3 facing armature disk 9, so that brake pad plate 3 is pressed onto housing part 11, in particular onto a brake surface provided on housing part 11, in particular via its other brake pad.

The radial clearance range covered by brake pad plate 3 is set apart from the radial clearance range covered by bolts 6.

Bolts 6 are, for example, set apart from one another at regular intervals in the circumferential direction and disposed at the same radial clearance in each case.

A sealing element, in particular of rubber, covers the region between magnetic body 4 and housing part 11 in the direction of the environment. The sealing element surrounds armature disk radially on the outside, i.e., is situated at a greater radial distance than armature in the axial region covered by armature disk 9, and thus is particularly radially set apart from armature disk 9.

Since first bushing 7 is made from a softer material than second bushing 8, armature 9 strikes second bushing 8 when the brake assembly is applied or when the brake assembly is released, and this impact is then transmitted to first bushing 7 and damped by first bushing 7. In addition, the first bushing is situated on bolts 6 made from metal and therefore mounted in a sliding manner.

Polymer or an elastomer is therefore, for example, selected as the material for first bushings 7.

In the exemplary embodiment illustrate in FIGS. 1 and 2, first bushing 7 has an axially smaller extension than second bushing 8.

With increasing wear of the brake pads, the distance between magnetic body 4 and housing part 11 is adjustable by turning nut 14. This is because bolt 6 has a step by which it rests against housing part 11 when bolt 6 is screwed into housing part 11.

In particular, the axial direction is always parallel to the direction of the axis of rotation of the shaft in this case, the circumferential direction relates to the angle of rotation of the shaft, and the respective radial clearance is related to the distance from the axis of rotation of the shaft.

Housing part 11 is, for example, connected to a flange part 12, in particular a bearing flange, of the electric motor in a reversible manner, but the connection is implemented in accordance with a high protection category, i.e., in a tight manner. Flange part 12 accommodates a bearing 13 which rotatably mounts the shaft, in particular rotor shaft 2, and is connected to a stator housing of the motor, which is connected to a further flange part accommodating a further bearing of the rotor shaft.

In exemplary embodiments, first bushing 7 has the same axial extension as second bushing 8 or a greater axial extension than second bushing 8. Counterspring 10, for example, exerts pressure on second bushing 8 and thereby presses it against magnetic body 4. In contrast to the example embodiment illustrated in FIGS. 1 and 2, the spring force of counterspring 10 in this example embodiment is thus not routed through first bushing 7 but through second bushing 8. First bushing 7 then only has the function of the sliding mounting on bolt 6 and of damping the impact introduced by armature disk 9 into second bushing 8.

In further exemplary embodiments, the first bushing is arranged as a ring made of a polymer, in particular as an O-ring, especially made from rubber. This ring is pressed into second bushing 8, which is produced from steel.

In further exemplary embodiments, the armature disk in an electromagnetically actuable brake assembly for an electric motor is thus disposed in a torsionally fixed but axially displaceable manner relative to a bolt onto which a plastic bushing is placed, which is pressed into a metal bushing.

Figure 4:
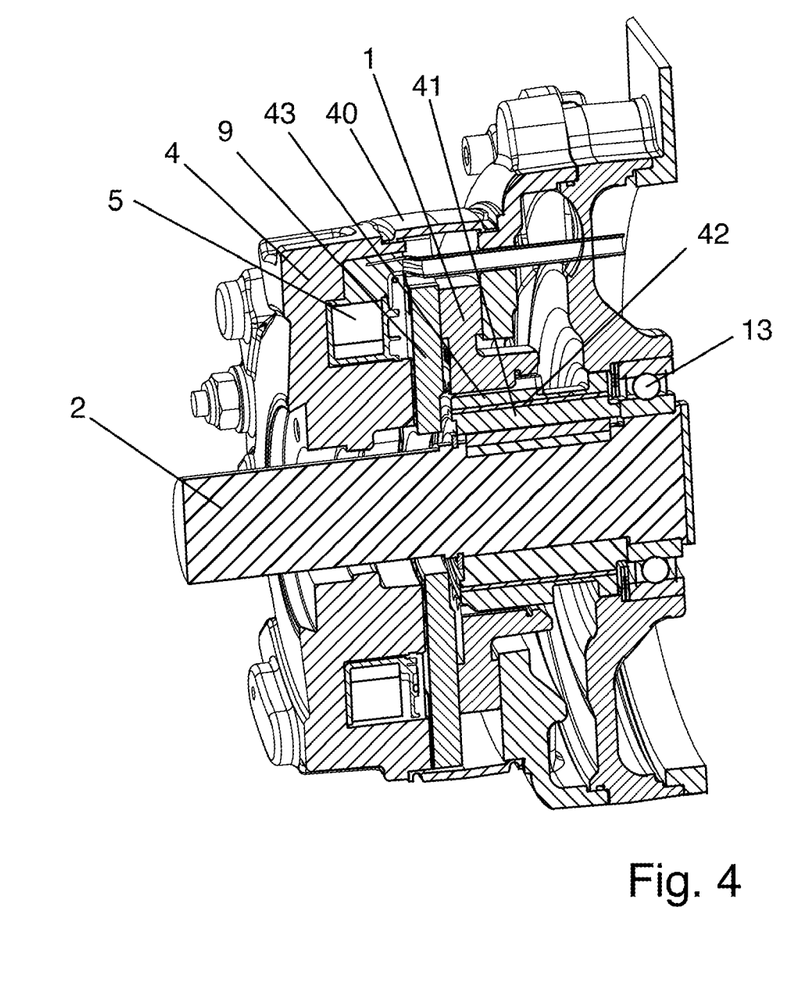
FIG. 4 is a partial, perspective cross-section view of an electromagnetically actuable brake assembly of an electric motor according to an example embodiment of the present invention, in which a driver includes multiple parts.
Figure 5:
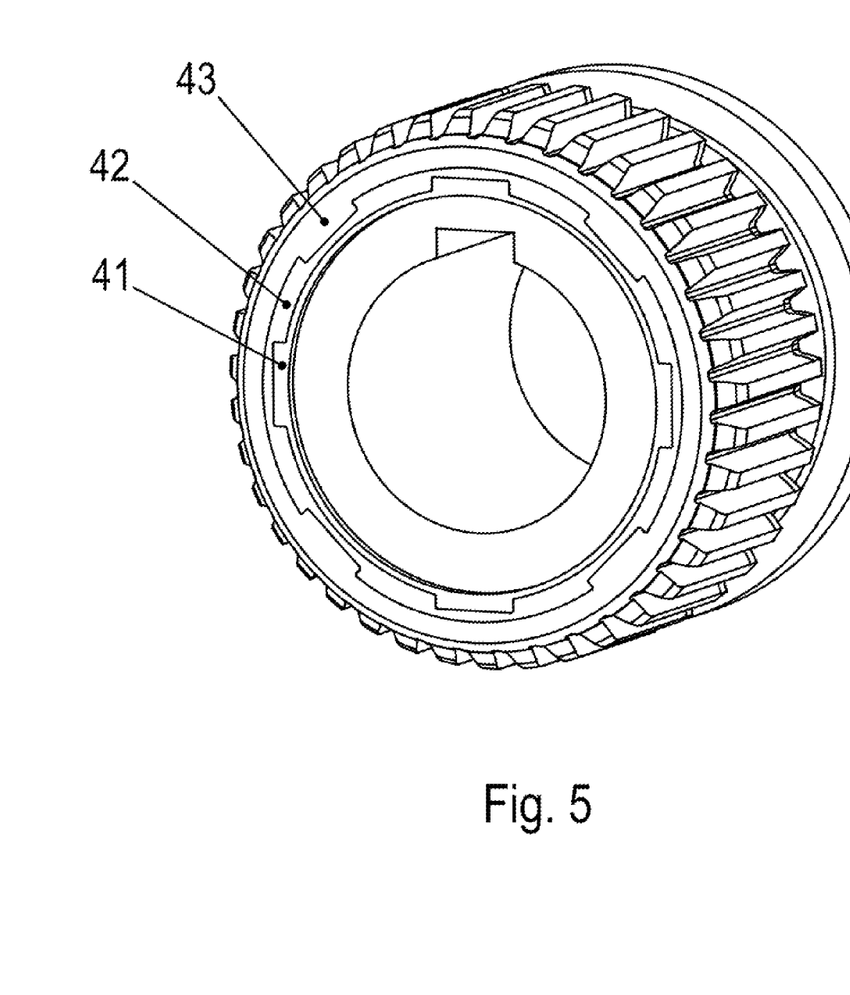
FIG. 5 is a perspective view of the driver.

As illustrated in FIGS. 4 and 5, the driver has a multipart configuration as the sole difference from the previously mentioned exemplary embodiments.

In addition, sealing element 40 is illustrated, which is connected at its first axial end region to magnetic body 4 and connected at the other axial end region to housing part 11.

Inner driver part 41 is connected to shaft 2 with the aid of a feather key connection and has radially-outwardly projecting web regions which have an axial extension and are set apart from one another in the circumferential direction, for example, at regular intervals.

An outer driver part 43 has web regions which project radially inward, have an axial extension, and are set apart from one another in the circumferential direction, for example, at regular intervals, and are also set apart in the circumferential direction from the web regions of inner driver part 41, but overlap in the radial direction.

The radial clearance range covered by the web regions of outer driver part 43 overlaps with the web regions of inner driver part 41.

Situated radially between inner driver part 41 and outer driver part 43 is an intermediate layer 42, which is made of a plastic material, in particular a polymer and/or an elastomer.

Torsional impacts, i.e., torque jerks, are able to be damped in this manner. For if the brake is released or applied, for instance, a brake torque is introduced into the shaft, in particular into rotor shaft 2. In the process, the torque travels through intermediate layer 42, which is elastically deflected and also absorbs energy. The impacts are therefore able to be reduced.

The web regions, for example, have a rectangular profile in each case. The web regions extend in the axial region, e.g., without a helix angle.

In a failure of intermediate layer 42, the positive engagement between the web regions of the inner and outer driver parts (41, 43) with play in the circumferential direction then takes effect. This provides greater safety. For if intermediate layer 42 fails, the brake function can still be ensured, and a greater noise emission occurs because the web regions strike against one another so that an acoustic warning signal is generated.

Outer driver part 43 has on its radial outer side a tooth system, i.e., especially the tooth system, especially the outer tooth system, that is similar to the tooth system of driver 1 of the afore-described exemplary embodiments, in particular as illustrated in FIGS. 1 through 3.

Figure 6:
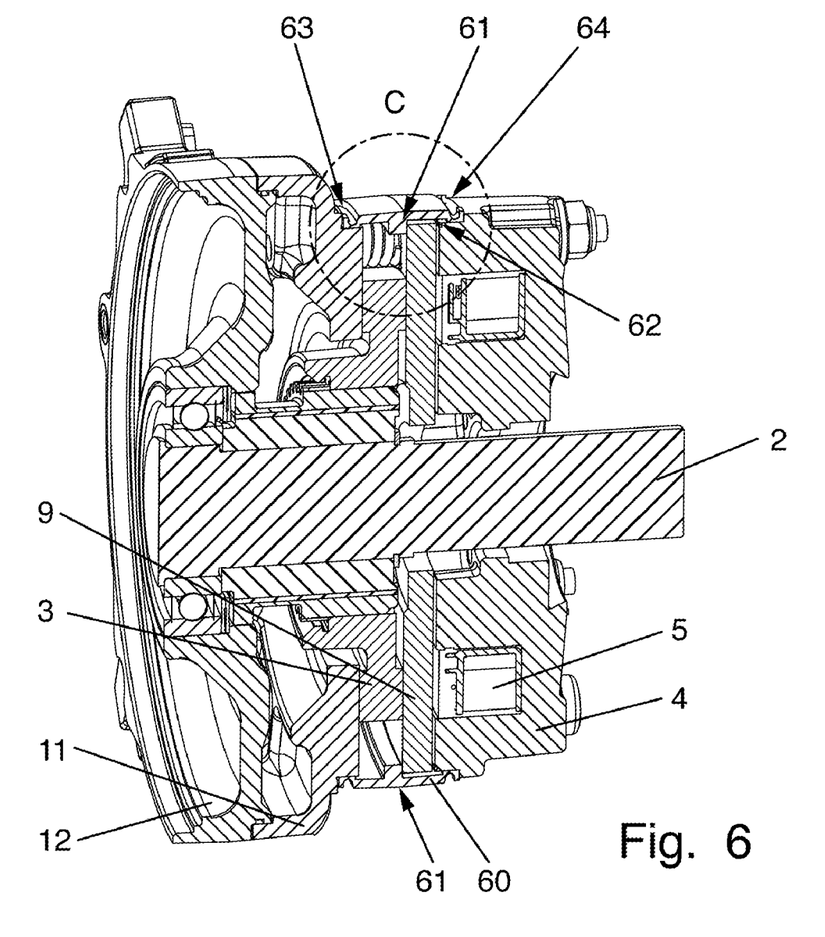
FIG. 6 is a partial, perspective cross-sectional view of a further electromagnetically actuable brake assembly of an electric motor according to an example embodiment of the present invention, a sealing element exerting a restoring force on armature disk with the aid of a radially-inwardly projecting nose region.
Figure 7:
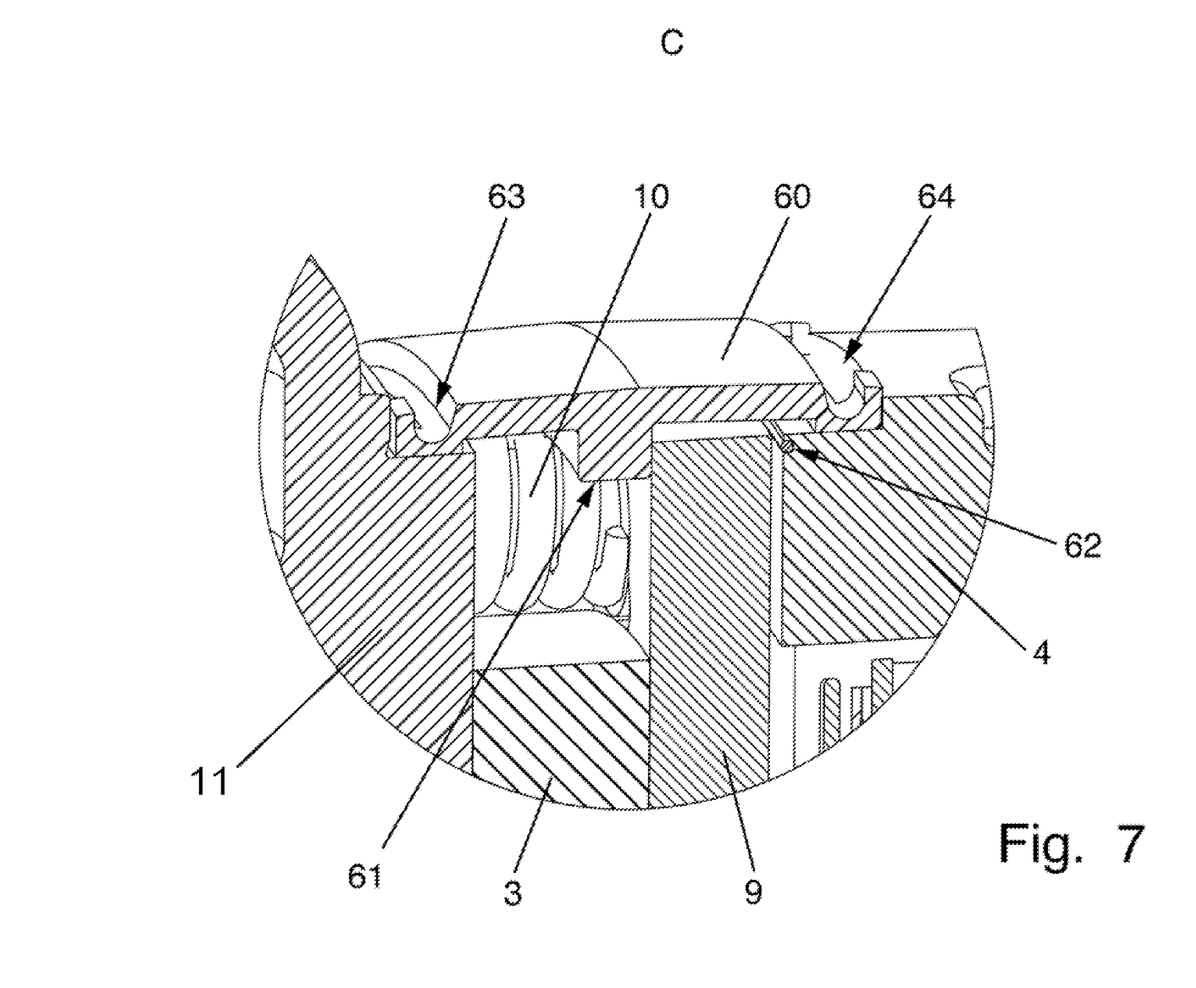
FIG. 7 is an enlarged view of a portion of FIG. 6.

As illustrated in FIGS. 6 and 7, a sealing element 60 instead of sealing element 40 is provided to cover the working region of armature disk 9 and brake pad plate 3. Sealing element 60 has a nose region 61 that projects radially inward and elastically restricts armature disk 9 in the axial direction. As a result, armature disk 9 exerts pressure on nose region 61 when winding 5, i.e., especially coil 5, is not energized.

When armature disk 9 is pushed away from magnetic body 4 by the spring supported on the magnetic body, i.e., in particular in the axial direction toward brake pad plate 3, nose region 61 acts in opposition and thus dampens the strike of armature disk 9 against brake pad plate 3.

Elastically deflectable nose region 61 thus dampens the striking of armature disk 9 against brake pad plate 3.

Sealing element 60 including nose region 61 covers a radial distance range which overlaps with the radial distance range covered by armature disk 9.

In a first depression 63 of sealing element 60, in particular in an annular depression circumferential in the circumferential direction, a clamp is able to be fastened, which shrinks onto housing part 11 when sealing element 60 is actuated and thus exerts pressure in a non-positive manner.

In the same manner, a clamp is able to be fastened in a second depression 64 of sealing element 60, in particular in a second, annular depression circumferential in the circumferential direction, the clamp shrinking onto magnetic body 4 when sealing element 60 is actuated and thus exerting pressure in a non-positive manner.

Situated on magnetic body 4 in an annular groove of magnetic body 4 circumferential in the circumferential direction is a sealing ring 62, in particular an O-ring, especially a plastic or rubber ring. Sealing ring 62 axially projects in the direction of armature disk 9 so that the strike of armature disk 9 against magnetic body 4 is damped as well.

Sealing ring 62 is, for example, situated at the largest radial distance, this radial distance being situated in the radial clearance range covered by armature disk 9.

Sealing ring 62 and nose region 61 are, for example, arranged to have an axial extension such that armature disk 9 is in contact both with sealing ring 62 and with nose region 61 during its entire working stroke, i.e., without interruption. This makes it possible to reduce fluctuating effects.

The pretensioning force, in particular spring force, of sealing ring 62 is greater than the spring force induced by nose region 61, at least when the brake has been applied.

The spring force generated by sealing ring 62 thus acts in addition to the spring force of the spring. The spring force introduced by nose region 61 into the armature disk, on the other hand, acts in the opposite direction.

LIST OF REFERENCE NUMERALS

1 driver
2 rotor shaft
3 brake pad plate
4 magnetic body
5 coil
6 bolt, in particular threaded bolt
7 first bushing, in particular plastic bushing
8 second bushing, in particular metal bushing
9 armature disk
10 spring part
11 housing part
12 flange part, in particular bearing flange
13 bearing
14 nut
40 sealing element
41 inner driver part
42 intermediate layer
43 outer driver part
60 sealing element
61 nose region
62 sealing ring
63 depression, in particular annular depression circumferential in the circumferential direction
64 depression, in particular annular depression circumferential in the circumferential direction

The invention claimed is:

1. A brake assembly for an electric motor, comprising:
a brake pad plate;
a shaft;
a magnetic body;
a winding;
a housing part with a brake surface; and
an armature disk;
wherein the brake pad plate and the armature disk are arranged axially between the housing part and the magnetic body;
wherein a sealing element is connected and/or press-fitted in a non-positive manner to the housing part in a first axial region and to the magnetic body in a second axial region, the sealing element radially surrounding the armature disk and the brake pad plate and/or covering and/or sealing a space region accommodating the armature disk and the brake pad plate in a direction of the environment, a thickened region and/or a radially-directed thickened region circumferential in a circumferential direction being arranged on the sealing element so that a nose region projects radially inward and adapted to limit the armature disk in the axial direction.

2. The brake assembly according to claim 1, further comprising:
a bolt;
a spring part; and
a first bushing;
wherein the housing part is connected and/or connected with a positive fit in at least a circumferential direction to the magnetic body by the bolt, the first bushing is accommodated in and/or pressed into a second bushing, the spring part supported on the housing part is adapted to push the first bushing and/or the second bushing toward the magnetic body, a radial clearance range covered by the armature disk includes and/or encompasses a radial clearance range covered by the second bushing, an axial region covered by the armature disk includes, encompasses, and/or overlaps an axial region covered by the second bushing.

3. The brake assembly according to claim 2, wherein the first bushing is formed of a softer and/or a more elastic material than the second bushing, the first bushing is formed of rubber, a rubberized material, a plastic material, and/or a polymer, the second bushing is formed of metal and/or steel, the first bushing is pressed into the second bushing, the first bushing includes an O-ring, the first bushing is slidingly mounted on the bolt and/or placed on the bolt with an accurate fit, and/or the armature disk is connected to the second bushing and/or the bolt with play and with a positive fit in the circumferential direction.

4. The brake assembly according to claim 2, wherein the bolt is connected to the housing part by screws and is guided through a recess that extends radially through the magnetic body, a nut is screwed onto a threaded region provided on a side of the magnetic body facing away from the housing part, the bolt has a step by which the bolt rests against a step of a stepped bore in the housing part, the bolt is connected to the magnetic body by screws and routed through a recess that extends axially through the housing part, a nut is screwed onto a threaded region provided on a side of the housing part facing away from the magnetic body, and/or the bolt has a step by which the bolt rests against a step of a stepped bore in the magnetic body.

5. The brake assembly according to claim 2, wherein an axial region covered by the second bushing is smaller than an axial region covered by the first bushing, the spring part is adapted to push the first bushing toward the magnetic body, and/or the axial region covered by the second bushing is equal to or greater than the axial region covered by the first bushing, the spring part adapted to push the second bushing toward the magnetic body.

6. The brake assembly according to claim 1, wherein the driver includes an inner driver part, an outer driver part, and an intermediate layer arranged radially between the inner driver part and the outer driver part, the inner driver part and the outer driver part are spaced apart from each other, each of the inner driver part and/or the outer driver part includes an annular configuration, and/or the inner driver part is arranged radially within the outer driver part.

7. The brake assembly according to claim 6, wherein the inner driver part has web regions that project radially outward and/or into the intermediate layer, and/or the outer driver part has web region that project radially inward and/or into the intermediate layer.

8. The brake assembly according to claim 6, wherein the intermediate layer is formed of a plastic material, a sealing compound, an adhesive, a polymer, and/or an elastomer, the inner driving part and the outer driver part are formed of metal and/or steel, and/or a radial clearance range covered by the outer driver part and/or a radial clearance range covered by the web regions of the outer driver part overlaps with a radial clearance range covered by the inner driver part and/or overlaps with a radial clearance range covered by the web regions of the inner driver part.

9. The brake assembly according to claim 1, wherein a sealing ring adapted to restrict the armature disk counter to the axial direction is arranged on the magnetic body, the sealing ring being accommodated in an annular groove provided in the magnetic body, a ring axis corresponding to an axis of rotation of the shaft.

10. The brake assembly according to claim 9, wherein a spring force generated by the sealing ring and acting on the armature disk is greater in absolute amount than a spring force generated by an elastically tensioned and/or pretensioned nose region acting on the armature disk, in a released state of the brake assembly and/or when the winding is energized, a radial clearance range covered by the sealing element and/or by the nose region of the sealing element overlaps with a radial clearance range covered by the armature disk, and/or an axial region covered by the sealing element and/or the nose region of the sealing element overlaps with an axial region covered by the brake pad plate and/or abuts and/or abuts without overlap an axial region covered by the armature disk.

11. The brake assembly according to claim 9, wherein a ring axis of the sealing ring corresponds to an axis of rotation of the shaft, and/or the nose region has an annular configuration and/or has a circumferential configuration in the circumferential direction, a ring axis of the nose region corresponding to the axis of rotation of the shaft and/or an axis of symmetry of the nose region corresponding to the axis of rotation of the shaft.

12. The brake assembly according to claim 1, wherein the sealing element includes, on two axial end regions, a radially-directed depression and/or a reduction of a wall thickness, circumferential in the circumferential direction, adapted to accommodate a ring-shaped clamping element, a clamping ring, a clamp, and/or a tensioning ring.

13. The brake assembly according to claim 1, wherein a ring part is arranged at a radial distance and/or a greatest radial distance located in a radial clearance range covered by the armature disk.

14. The brake assembly according to claim 1, wherein the driver includes an inner driver part and an outer driver part connected to each other by an intermediate layer and/or the driver is arranged as a metal-plastic composite part, the brake pad plate including an inner tooth system that meshes with an outer tooth system of the outer driver part so that the brake pad plate is connected to the driver and/or to the outer driver part and/or the shaft in a torsionally fixed but axially displaceable manner, the inner driver part is connected to the shaft in a torsionally fixed manner, without play, and/or by a feather key connection, each of the inner driver part, the outer driver part, the intermediate layer, and/or the driver is arranged as a ring part, and/or the outer driver part includes a tooth system and/or an outer tooth system on a radially outer surface that meshes with the inner tooth system of the brake pad plate.

15. The brake assembly according to claim 1, wherein the winding is accommodated in a recess of the magnetic body, the armature disk is connected with play to the magnetic body and/or to the bolt, in an axially movable and torsionally fixed manner, a brake pad plate that is axially displaceable on the shaft and connected to the shaft in a torsionally fixed manner is arranged between the housing part and the armature disk, a spring supported on the magnetic body is adapted to push the armature disk away from the magnetic body in an axial direction toward the brake pad plate, when the ring winding is energized, the armature disk is pulled toward the magnetic body while overcoming a spring force generated by the spring, and when no energization takes place, the spring pushes the armature disk onto the brake pad plate and/or onto a brake pad situated on the side of the brake pad plate facing the armature disk, and/or the housing part is tightly and reversibly connected to a flange part that accommodates a bearing for mounting the shaft.

16. An electric motor, comprising:
a stator housing
a first flange part connected to the stator housing;
a first bearing accommodated in the first flange part;
a second flange part connected to the stator housing;
a second bearing accommodated in the second flange part; and
a brake assembly as recited in claim 1;
wherein the shaft is mounted in the first bearing accommodated in the first flange part and in the second bearing accommodated in the second flange part, the flange parts being connected to a stator housing of the motor; and
wherein the shaft is arranged as a rotor shaft of the motor.

* * * * *